US011007638B2

(12) United States Patent
Cobb et al.

(10) Patent No.: US 11,007,638 B2
(45) Date of Patent: May 18, 2021

(54) TELESCOPING SUPPORT ROBOT AND METHODS OF USE THEREOF

(71) Applicant: HONDA MOTOR CO., LTD., Tokyo (JP)

(72) Inventors: Derrick Ian Cobb, Delaware, OH (US); Richard Wolfgang Geary, Hilliard, OH (US); Michael Gienger, Hessia (DE); Stefan Fuchs, Hessia (DE)

(73) Assignee: HONDA MOTOR CO., LTD., Tokyo (JP)

( * ) Notice: Subject to any disclaimer, the term of this patent is extended or adjusted under 35 U.S.C. 154(b) by 218 days.

(21) Appl. No.: 16/228,563

(22) Filed: Dec. 20, 2018

(65) Prior Publication Data

US 2020/0198123 A1 Jun. 25, 2020

(51) Int. Cl.
*B25J 9/14* (2006.01)
*B25J 9/02* (2006.01)
*B25J 18/02* (2006.01)
*B25J 9/10* (2006.01)
(Continued)

(52) U.S. Cl.
CPC ............. *B25J 9/026* (2013.01); *B25J 9/0084* (2013.01); *B25J 9/104* (2013.01); *B25J 9/142* (2013.01); *B25J 18/025* (2013.01); *F16H 25/20* (2013.01)

(58) Field of Classification Search
CPC . B25J 9/0084; B25J 9/026; B25J 9/104; B25J 9/142; B25J 18/025; B25J 19/0075; F16H 19/06; F16H 2019/085; F16H 25/20
See application file for complete search history.

(56) References Cited

U.S. PATENT DOCUMENTS

| 3,261,589 A | 7/1966 | Neumeier |
| 3,433,370 A | 3/1969 | Eisert et al. |

(Continued)

FOREIGN PATENT DOCUMENTS

| EP | 0982018 A2 * | 3/2000 | ............ A61G 7/012 |
| GB | 1 589 696 | 10/1977 | |

(Continued)

OTHER PUBLICATIONS

Hawkes, E, et al., "A soft robot that navigates its environment through growth," Science Robotics, vol. 2, Issue 8, eaan3028, accessed on Dec. 19, 2018. http://robotics.sciencemag.org/content/2/8/eaan3028.

*Primary Examiner* — Saul Rodriguez
*Assistant Examiner* — Brendan P Tighe
(74) *Attorney, Agent, or Firm* — Arent Fox LLP

(57) ABSTRACT

A support robot and control system having a support arm providing at least one degree of motion. The support robot includes a support arm supporting mechanism connected to the support arm and providing at least two degrees of motion. The support arm optionally includes a biomimetic actuator connectable to an end effector, a telescoping section operatively connected to the biomimetic actuator, and a tensile force transmitting member connected to an actuator. The actuator is capable of moving the biomimetic actuator towards and away from the actuator via the tensile force transmitting member. The support arm further includes an inflatable outer cover at least partially encasing the telescoping section and the tensile force transmitting member.

21 Claims, 14 Drawing Sheets

(51) Int. Cl.
*B25J 9/00* (2006.01)
*F16H 25/20* (2006.01)

(56) References Cited

U.S. PATENT DOCUMENTS

| | | | |
|---|---|---|---|
| 4,647,014 A * | 3/1987 | Ekman | F16H 19/06 |
| | | | 254/221 |
| 4,726,732 A | 2/1988 | Kato | |
| 4,850,382 A * | 7/1989 | Williams | B05B 13/0431 |
| | | | 134/167 R |
| 7,955,042 B2 | 6/2011 | Sugahara et al. | |
| 8,677,905 B2 | 3/2014 | Givens | |
| 2005/0036879 A1 | 2/2005 | Jhaveri et al. | |
| 2006/0156837 A1* | 7/2006 | Stoelinga | A47B 9/12 |
| | | | 74/89.2 |
| 2009/0249905 A1* | 10/2009 | Chen | F16H 25/2056 |
| | | | 74/89.37 |
| 2017/0072573 A1* | 3/2017 | Motokado | B25J 17/0283 |
| 2018/0126668 A1* | 5/2018 | El-Siblani | B29C 64/255 |

FOREIGN PATENT DOCUMENTS

| | | | |
|---|---|---|---|
| JP | 63-65973 A | | 3/1988 |
| JP | 2012228733 A | * | 11/2012 |
| RU | 697315 | | 11/1979 |

\* cited by examiner

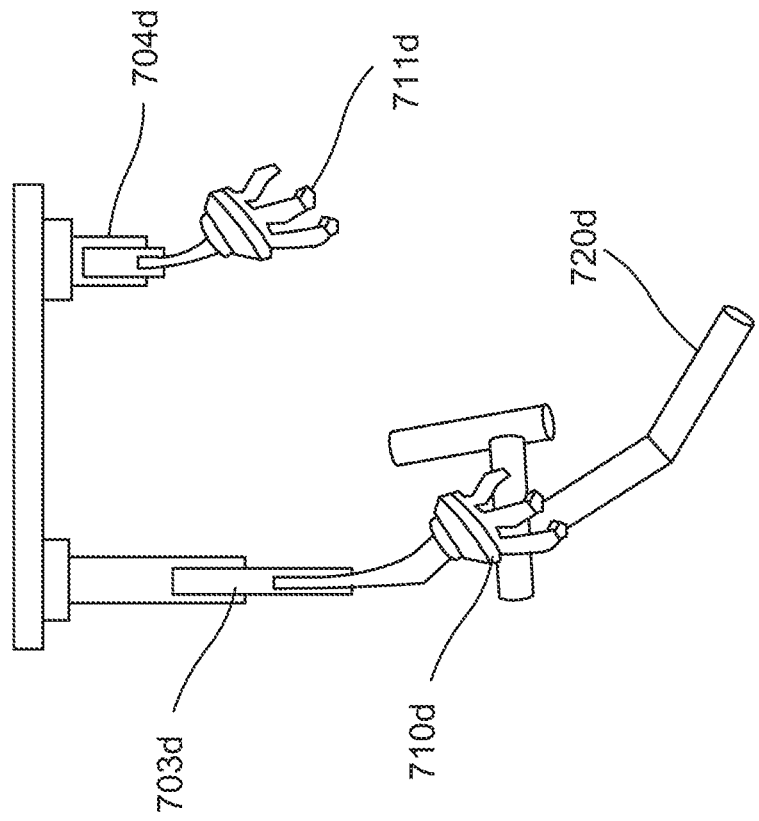
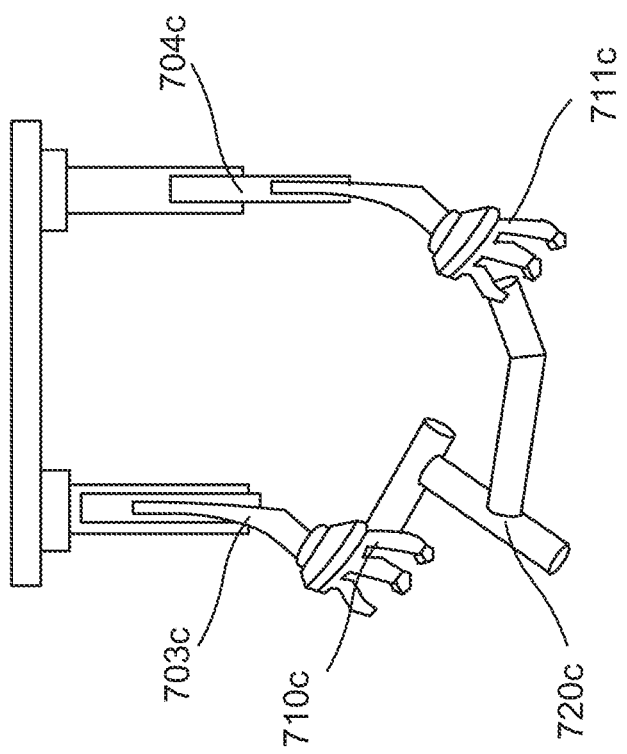
FIG. 8D
FIG. 8C

TELESCOPING SUPPORT ROBOT AND METHODS OF USE THEREOF

FIELD OF THE INVENTION

Aspects of the present disclosure relate to a support robot capable of providing assistance to a technician. More specifically, a support arm usable with a gantry and an effector.

BACKGROUND

Modern assembly lines and/or automobile assembly or repair processes still rely on tasks performed by technicians. Automation has significantly reduced the number of tasks performed by technicians; however, a number of tasks cannot be effectively or efficiently performed by automated systems due in part to an automated system's lack of ability to respond flexibly to changes in the assembly process and/or to perform certain complex tasks. Thus, the need for technicians in an assembly and/or repair environment still exists. However, there remains an unmet need to improve efficiency and worker safety when completing certain tasks. Automation may be especially useful in transporting or manipulating an object and/or assembly to improve the efficiency of tasks performed by technicians, for example. While manipulators for transporting loads such as robot arms exist, their complexity, high cost, and relatively low load carrying capacity compared to complexity and cost provides a need for a simpler solution that allows for increased load carrying capacity. Further, there remains an unmet need for a collaborative robot and/or system that is safe for technicians and would not cause injury if the robot and/or system were to come into contact with the technician. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In accordance with one aspect of the disclosure, a support arm usable with a gantry robot system is disclosed. The support arm comprises an interface connectable to an end effector, and a telescoping section operatively connected to interface. The support arm may further include a tensile force transmitting member connected to an actuator, wherein the actuator is capable of moving the interface towards and/or away from the actuator via the tensile force transmitting member. Further, an inflatable outer cover may at least partially encase the telescoping section and the tensile force transmitting member.

In accordance with one aspect of the disclosure, a support robot system is disclosed. The support robot system may include a gantry for providing at least two degrees of motion, and a support arm connected to the gantry, wherein the support arm provides at least one additional degree of motion. The support arm may further include an interface connectable to an end effector, a telescoping section operatively connected to the interface, and a tensile force transmitting member connected to an actuator. The actuator may be capable of moving the interface towards and/or away from the actuator via the tensile force transmitting member. The support arm may further include an inflatable outer cover at least partially encasing the telescoping section and the tensile force transmitting member.

In accordance with another aspect of the disclosure, a support robot and control system having a support arm providing at least one degree of motion are disclosed. The support robot further comprises a support arm supporting mechanism connected to the support arm and providing at least two degrees of motion. The support arm comprises: a biomimetic actuator connectable to an end effector; a telescoping section operatively connected to the biomimetic actuator; and a tensile force transmitting member connected to a tensile force actuator. The tensile force actuator is capable of moving the biomimetic actuator towards and/or away from the tensile force actuator via the tensile force transmitting member. The support arm further includes an inflatable outer cover at least partially encompassing the telescoping section and the tensile force transmitting member.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

FIGS. 8A-D are simplified plan views of a support robot system implementing multiple support arms as described with respect to FIGS. 1-7;

DETAILED DESCRIPTION

The disclosure relates to a support robot apparatus and system having an increased load carrying capacity and various safety improvements. In one example, the support robot apparatus and system is usable to assist workers in carrying and/or manipulating objects or loads, for example, in a factory or other industrial environment. For example, the support robot system may include a support arm mounted to a gantry. The gantry may be mounted over a factory floor. The support arm may be movable in at least a z-direction and may be mounted to the overhead gantry. The overhead gantry may be capable of moving the support arm in at least an x-direction and a y-direction with relation to the factory floor. In one example, the support arm may further include a first end having an effector and a biomimetic actuator for rotating and/or pivoting the effector. Further aspects of the present disclosure will be described with relation to the figures.

Figure 1:
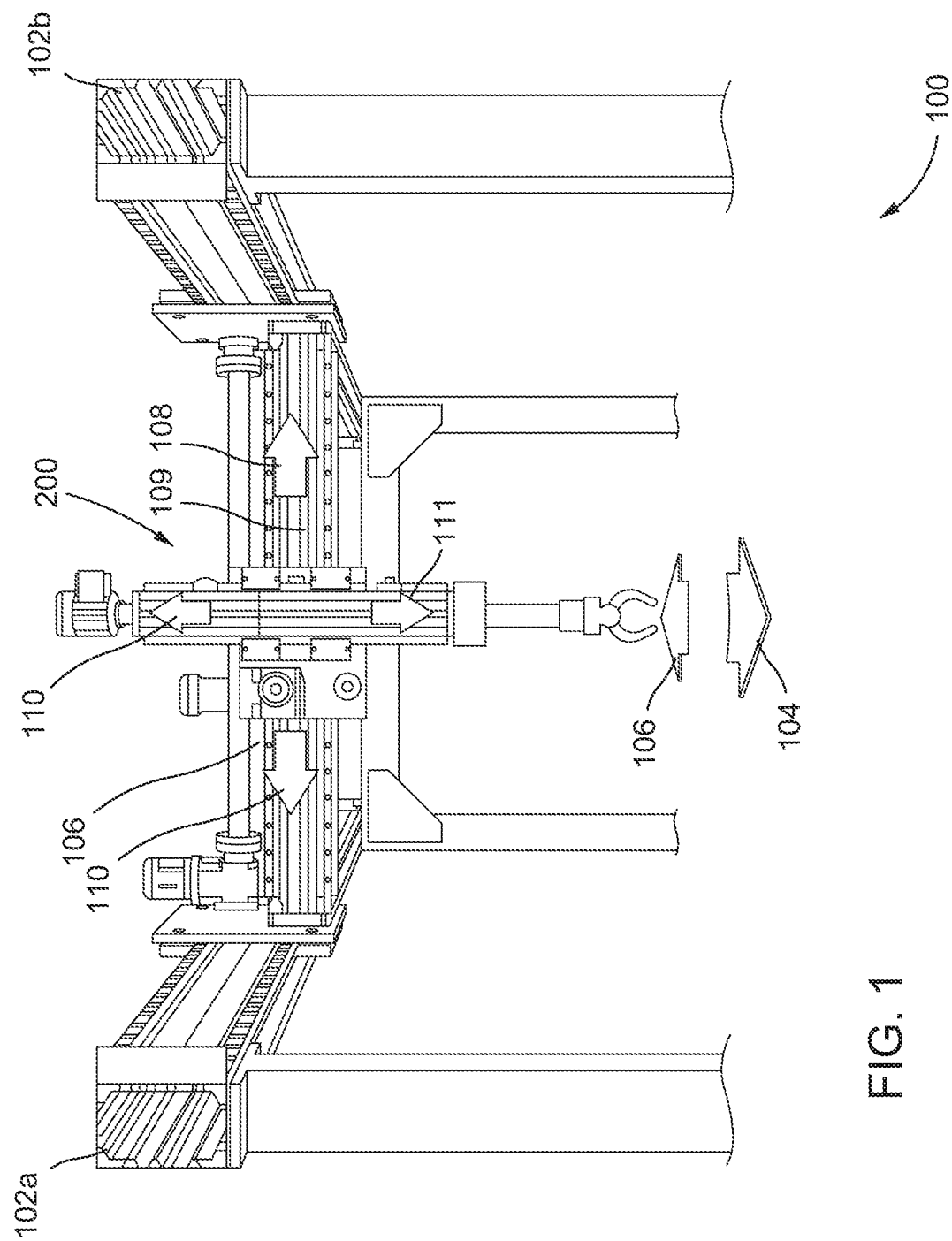
FIG. 1 is a perspective view of a gantry system usable with the support arm in accordance with one aspect of the disclosure.

As shown in FIG. 1, the current disclosure includes a support arm 200 usable with a gantry system 100, for example. One example of a gantry system usable with support arm 200 may include side rails 102A and 102B, slidably supporting cross beam 109. The cross beam 109 may be substantially perpendicular to the side rails 102A and 102B. The cross beam 109 may be movable in directions 104 and 106 along an x-axis with relation to the factory floor. While FIG. 1 shows a simplified version of support arm 200, the support arm 200 will be described in further detail with respect to FIGS. 2-7. The support arm 200 may be slidably supported on the cross beam 109. The support arm 200 may be movable in directions 110 and 108 along a y-axis with relation to the factory floor, as shown in FIG. 1. The cross beam 109 and/or the support arm 200 may be slidably movable along each of the aforementioned y-axis via a drive apparatus, for example. An example drive apparatus may include a single or plurality of servo motors, other motors, and/or hydraulic and/or pneumatic actuators operatively coupled to any one of or a combination of a belt drive, a screw shaft, a rack and pinion, and/or a hydraulic or pneumatic piston. As shown in FIG. 1, and explained in further detail with respect to FIG. 2 below, the support arm 200 may be moveable in an upward and downward z-axis direction 110 and 111, as shown in FIG. 1, respectfully with relation to the factory floor.

Figure 2:
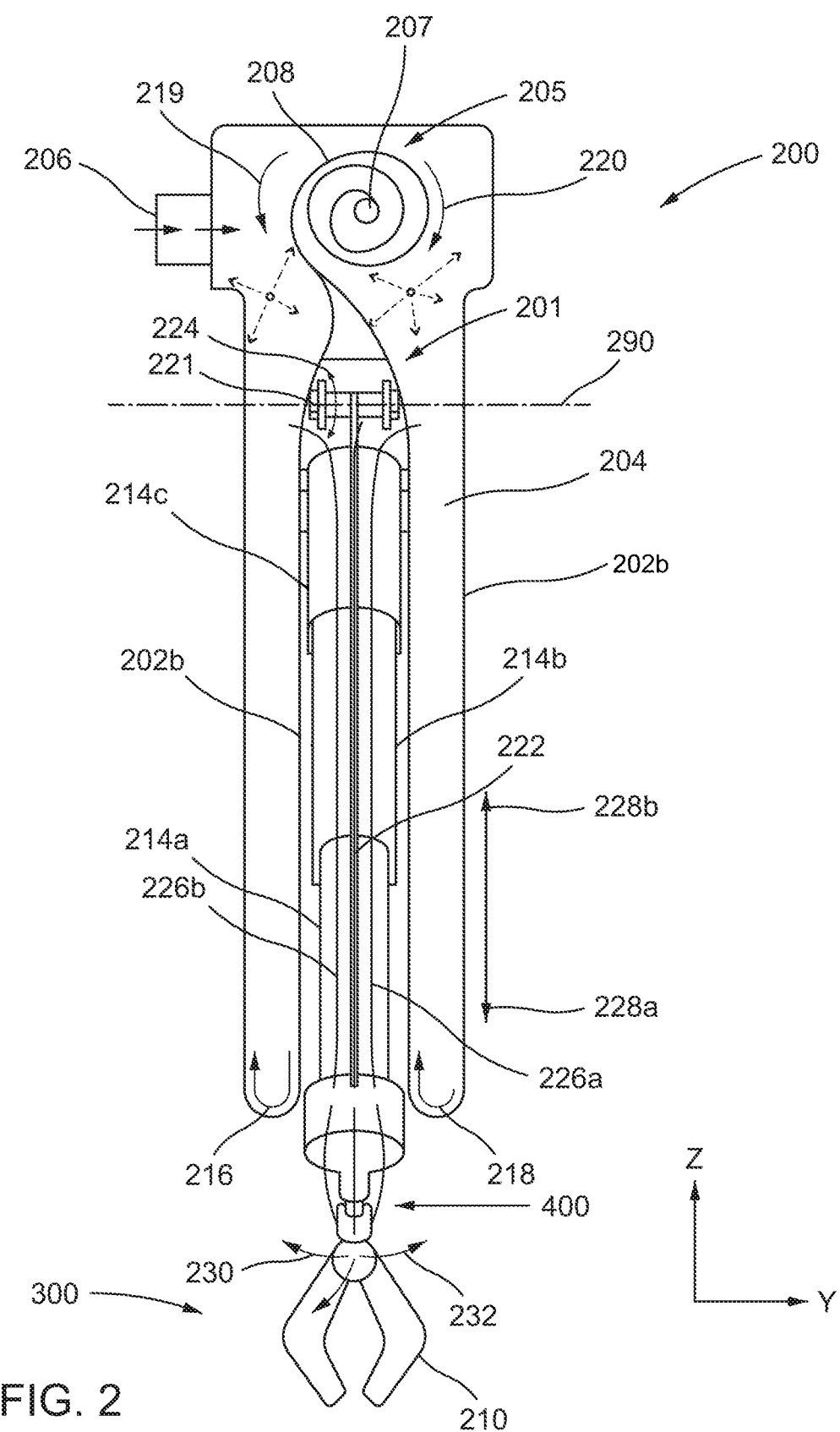
FIG. 2 is a cut-away front view of the support arm in accordance with one aspect of the disclosure.

FIG. 2 represents one example of a support arm 200 in accordance with aspects of the present disclosure. The support arm 200 may be mountable or mounted to a gantry system as shown in FIG. 1, for example. The support arm 200 may include a tensile force transmitting member 222. As shown in FIG. 2, one example implementation of a tensile force transmitting member 222, which may consist of or include a cable, for example, that may be connected at a first end to a spool 221. The spool 221 may be rotatably mounted so as to enable rotation about a first axis 290 in either rotational direction 224, for example, to retract or extend the transmitting member 222. In one example, the spool 221 may include a winch that is rotatable in directions 224 through operable communication with an electric, hydraulic, or pneumatic actuator, for example. In one example implementation, the spool 221 may be operatively connected to a rotating actuator via a transmission or gear reduction apparatus (not shown in FIG. 2). The tensile force transmitting member 222 may be operatively connected to a joint and/or interface 400 (hereinafter interchangeably referred to as a joint or interface).

While a transmitting member 222 is shown in FIG. 2, any type of device or system capable of suitably imparting a tensile force may be used instead of or in combination with the transmitting member 222 shown. For example, the tensile force transmitting member 222 may include a screw shaft engageable with a nut assembly capable of engageably receiving a helically toothed portion of the screw shaft. In the aforementioned example, rotation of the nut assembly on the helically toothed portion of the screw shaft may cause the screw shaft and end effector 210 and/or joint 400 to move in an upward 228B or downward 228A z-direction, as shown in FIG. 2, for example.

As shown in FIG. 2, in one aspect the joint 400 may also be operatively connected and/or connectable to an end effector 300. In one example, the tensile force transmitting member 222 may be directly connected to the end effector 210. While an end effector having two grasping members is shown in FIG. 2, the disclosed support arm 200 is usable with any suitable type of effector. The effector may for example include any interface configured to perform a predetermined work operation on a work subject, object, or load. For example, the end effector 210 may be configured to "grasp" and "release" the work subject, object, or load. In another example, the end effector 210 may be configured to engage with an engagement portion on the work subject, object, or load (e.g., a hook in the end effector 210 engaging a corresponding ring of the work subject). As another example, the end effector 300 may also be or include a robot hand having multiple bendable and stretchable finger members.

If the tensile force transmitting member 222 comprises a cable as discussed above, the tensile force transmitting member 222 may be capable of controlling any rate acceptable load connected to end effector 210 so as to cause movement in an upward 228B or downward 228A z-direction, for example, as shown in FIG. 2. However, a cable, while capable of imparting a significant tensile force in z-direction may not be capable of providing lateral rigidity to the support arm 200, for example. Accordingly, a plurality of segments 214A-C (hereinafter interchangeably referred to as telescoping sections, segments, and/or portions) forming a telescoping portion may provide lateral rigidity to the structure, while still allowing the joint 400 and/or end effector 210 to move in an upwards or downwards z-direction, as shown in FIG. 2. The telescoping portion may comprise, for example, a series of hollow segments that are sized and shaped to fit nestedly inside one another. For example, a first segment 214A may be dimensioned to fit inside second segment 214B and to be slidably received within the second segment 214B. The second segment with the received first segment 214A may then be dimensioned to slidably be received within third segment 214C. The first segment 214A may be configured to mechanically engage with the second segment 214B in order to be attached thereto and be slidably received therein, and the third segment 214C may be configured to mechanically engage with and be slidably received within the second segment 214B. The first segment 214A, for example, may be attached (e.g., by bolt, weld, or other attachment features or mechanisms) to the joint 400 or directly to end effector 210 so as to provide lateral rigidity to the overall support arm structure, while enabling extending and retracting motion with regard to the end effector 210.

In addition, the segments 214A-D may form a conduit for protecting various cables 226A and 226B and/or other features (e.g., electrical connection lines to sensors or other components), which may extend between the gantry and/or the top of the support arm to the joint 400 and/or end effector 210. As shown in FIG. 2, in one aspect, the telescoping sections 214A-C may further be configured to encompass or allow the tensile force transmitting member 222 to extend therethrough. During operation, as the tensile force transmitting member 222 is drawn in direction 228B (e.g., via rotation of spool 221 in one of rotational directions 224), the segments 214A-C may slidably drawn within one another to allow for up and down movement of the joint 400 and/or end effector 210 while still providing lateral stability to the support arm structure 200. Similarly, as the tensile force transmitting member 222 may be extended in direction 228A (e.g., via rotation of spool 221 in the opposite rotational direction 224 to the rotational direction 224 for drawing the member 222), the segments 214A-C may slidably extend relative to one another. It is noted that, while three segments 214A-C are shown in FIG. 2, the disclosure is not limited to such number of segments 214A-C. The support arm 200 may include any suitable number and length/size of segments necessary to allow for extension and retraction of the support arm 200 therewithin. Further, the cylindrical segments 214A-C may be substituted with segments of any suitable cross-sectional shape. In addition, the telescoping section may be substituted with any suitable structure that is capable of providing lateral rigidity while allowing the support arm 200 to extend and retract with respect thereto. For example, an accordion structure formed of a plurality of pivoting rigid elements may be substituted for the aforementioned segments 214A-C.

The support arm 200 may further include an inflatable outer bladder 201. The outer bladder 201 may include an inflatable and deflatable flexible chamber including an inner space 204 for receiving, a fluid such as air. The fluid may be provided and/or fluid pressure may be increased via a pump 206. As shown in FIG. 2, the outer bladder 201 may include an outer surface 202A and an inner surface 202B. The bladder 201 may be configured to partially or fully surround or encompass, while still allowing for movement of, at least part of the telescoping segments 214A-C and/or the interface or joint 400. Accordingly, the telescoping segments 214A-C may be independently movable within the bladder 201 to allow the joint 400 and/or effector to move in directions 228A and/or 228B. In the aforementioned aspect, the bladder 201 may further be configured to extend in direction 228A to partially or fully surround or encompass the end effector 210; this feature may be useful for protecting the effector 210 and/or a user from contact with the effector 210 when the effector is not in use, for example. Further, a storeable portion 205 of the bladder 201 may be woundably stored in a non-inflated or non-expanded state so as to allow the bladder 201 to unspool and expand in direction 228A or to contract and be spooled in direction 228B either in combination with or independently from a corresponding upward or downward movement of the joint 400 and/or end effector 210 (i.e., in directions 228A and 228B respectively).

As shown in FIG. 2, in one example implementation of the aforementioned bladder 201, the inner surfaces 202B of the bladder may be wound 208 around a storing spool 207. The storing spool 207 may rotate around a spool axis and may be spring loaded so as to be biased to wind and retract the inner surface 202B of the bladder 201 onto the spool 207. The bladder 201 may unspool and expand with incoming fluid (e.g., air) as air is received and the telescoping portion 214A-214C expands and contracts, respectively.

In another example implementation, the spool 207 may be connected to any suitable motor, hydraulic, and/or pneumatic actuator capable of controlling the rotation of the spool 207. In use, an increase in fluid pressure provided by the pump 206 may cause an outward pressure on the outer surfaces 202A and inner surfaces 202B of the bladder 201. The outward pressure may cause the bladder 201 to expand and unspool, thereby causing the spool 207 to rotate in direction 219. Accordingly, a stored portion 205 of the bladder 201 is thereby unspooled causing both the outer surface 202A and the inner surface 202B to increase in length and/or expand, including with corresponding expanding movement of the telescoping portion 214A-214C in direction 228A. The increase in length of the telescoping portion 214A-214C corresponds with the bladder 201 extending in the downward z-direction 228A. Thus, when the telescoping portions 214A-C and/or tensile force transmitting member 222 is lengthened in a downward z-direction, the bladder 201 may thereby be lengthened and/or expanded to cover the newly extended portion of the telescoping portions 214A-C and/or tensile force transmitting member 222.

Conversely, when a pressure is decreased within the bladder 201, for example, the decrease in pressure may cause the bladder 201 to contract slightly and the spool 207 may correspondingly rotate in direction 220, for example, via either a spring and/or a driving apparatus, such as a motor or other actuator capable of rotating the spool 207. Accordingly, an inner surface 202B of the bladder may be spooled onto spool 207, thereby causing both the outer surface 202A and the inner surface 202B to decrease in length of extension along the z-direction via an inward movement of the surface in direction 218B. Thus, when the telescoping portions 214A-C and/or tensile force transmitting member 222 are retracted in a upward z-direction, the bladder 201 may correspondingly contract with the retraction of the telescoping portions 214A-C and/or tensile force transmitting member 222. The bladder 201 may be controlled to provide a cushioned outer covering for the telescoping portions 214A-C of the arm assembly and/or a portion of or all of the joint 400. Thus the bladder 201 may be useful, for example, in providing cushioning buffer in case of potential contact of the support arm 200 with another object, including, for example, a technician or other user. Further, the bladder 201 may provide protection to the inner portion of support arm 200 and/or may further provide some lateral rigidity to the structure of the support arm 200.

Figures 3A, 3B, 3C:
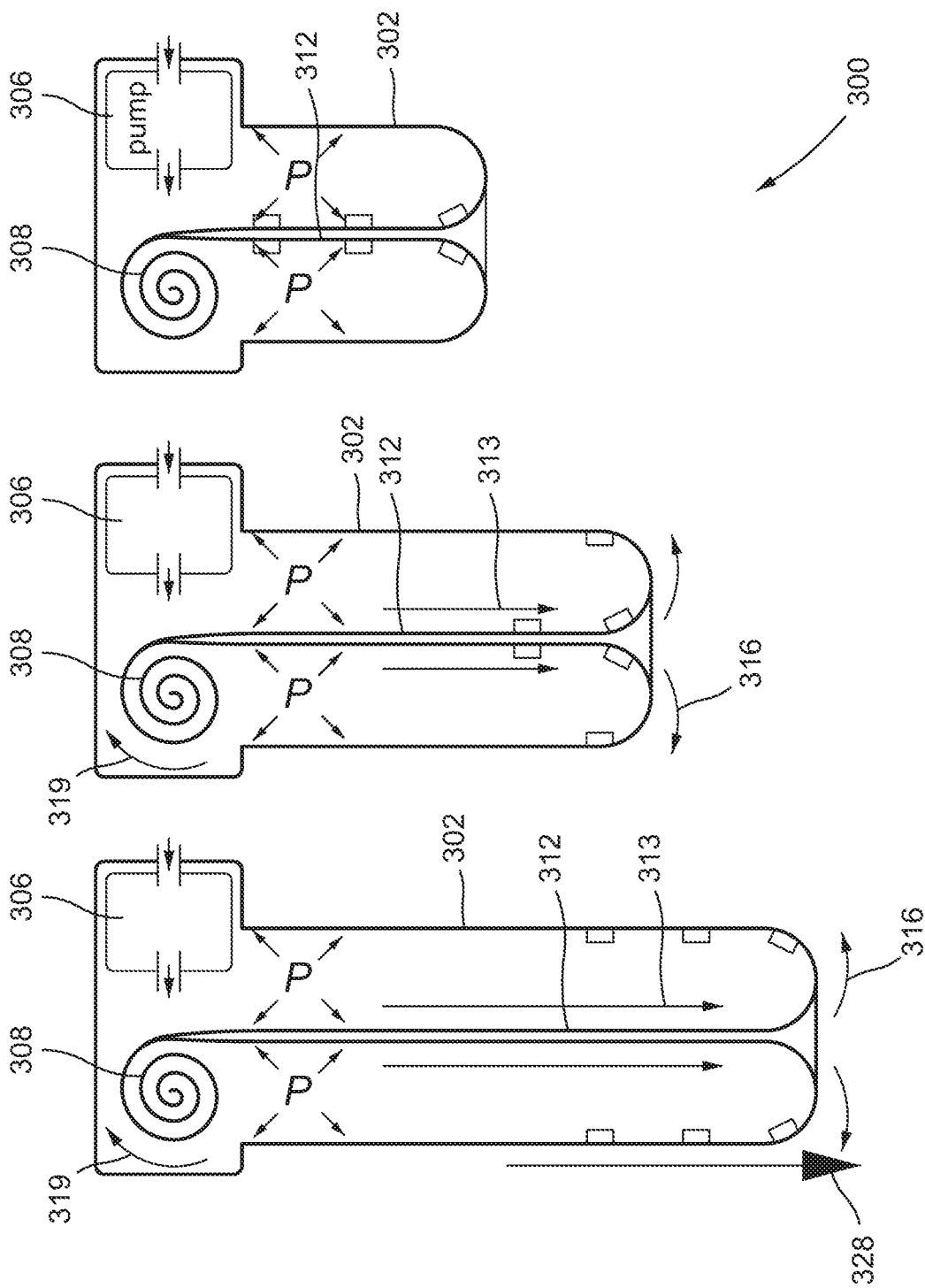
FIGS. 3A-C are simplified plan views of the outer flexible cover usable with the support arm in accordance with one aspect of the disclosure.

FIGS. 3A-3C show a representative view of an example bladder 302 for use with the inner telescoping portion and the tensile force transmitting member of FIG. 2 (but with such telescoping portion and transmitting member of FIG. 2 not being shown in FIG. 3 for simplicity and clarity with regard to operation of the bladder 302 of FIG. 3). As shown in FIG. 3A, when the bladder 302 is in a retracted state and an extension of the bladder in the z-direction (downward as shown in FIGS. 3A-3C) is desired, a pump 306 may be controlled to increase the pressure within the bladder. The pressure increase within the bladder 302 by the pump 306 may cause the bladder 302 to expand, thereby resulting in a spool of a stored portion 308 of the bladder 302 to unwind from the spool in direction 319, as shown in FIG. 3B. the length of the enclosed inner surface 312 between downwardly extending portions of the bladder 312 may thereby increase, as shown in FIG. 3B relative to FIG. 3A, via movement of portions of the bladder 302 downward as shown in FIGS. 3A and 3B, with the downwardly extending portions of the bladder 302 about inner surface 312, as shown in FIG. 3B, unfolding with the extension of the bladder portions 302 in direction 316. The increase in length 312 causes the bladder 302 to continue thereby to extend further in a downward z-direction 328, for example, as shown in FIG. 3C. Thus, the bladder 302 may be extended to cover an extended portion of the telescoping portions 214A-C (FIG. 2) and/or tensile force transmitting member 222 (FIG. 2), when located within enclosing inner surface 312.

In another example implementation, the bladder may be or include two separate sections, each having one end connected to the joint 400 and/or end effector 210 (FIG. 2). The two sections of the two piece bladder may be held together via a length of hook and loop fastener connected to each of the bladders, for example. In one aspect, the aforementioned two sections of the two piece bladder may be spooled onto a corresponding first and second spool, which may function in a similar manner to the aforementioned single spool 207 (FIG. 2). Accordingly, in the aforementioned example, such bladder may be connected to and extend or contract along with the telescoping portions 214A-C (FIG. 2) and/or tensile force transmitting member 222 (FIG. 2) similarly to as shown in FIGS. 3A-3C.

The example bladders as shown and described with respect to FIGS. 1-3C may be formed of or comprise a flexible and/or stretchable material, for example. Some example such material may include: rubbers, silicones, vinyls, polyvinyl chloride (PVC), polyurethane, polyester, nylon, bioplastic, polyethylene, polypropylene, thermoplastics and phthalate free plastics.

Figure 4:
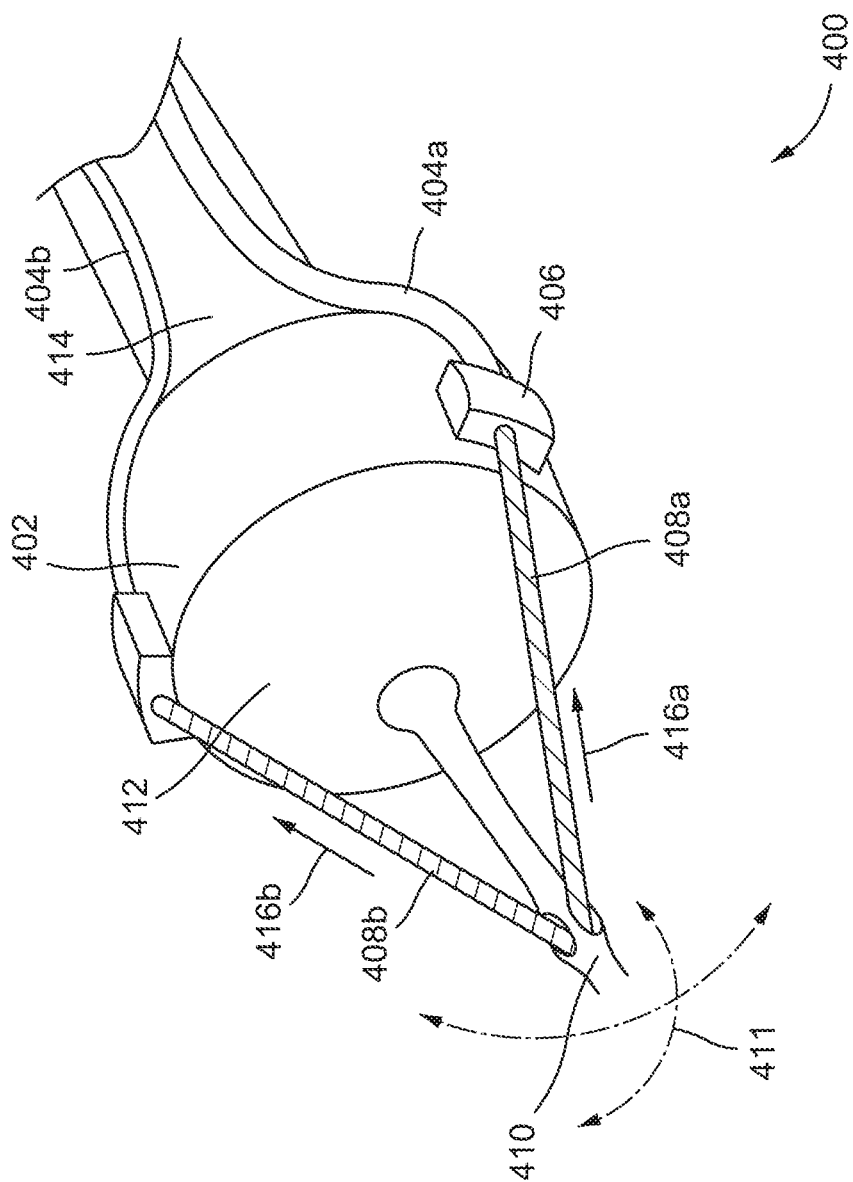
FIG. 4 is a perspective view of a biomimetic actuator usable with the support arm in accordance with an aspect of the disclosure.

As discussed with reference to FIG. 2, the support arm 200 may include a joint 400. The joint 400 may be or include a biomimetic actuator. Various examples of biomimetic actuators usable with the support arm 200 (FIG. 2) are shown in FIGS. 4-7. In the example shown in FIG. 4, the biomimetic actuator 400 may include a ball portion 412 and corresponding socket portion 402. The socket portion 402 may include a housing having a concave and generally spherical receiving portion for receiving the generally spherical ball 412. The ball 400 may be connected to or connectable via a connection portion 410 to another component, such as end effector 210 (FIG. 2) of the support arm 200 (FIG. 2). The socket portion 402 may have extending therefrom a socket connection portion 414 for connection with, for example, the telescoping portion 214A (FIG. 2) and/or the tensile force transmission member 222 (FIG. 2). The biomimetic actuator shown in FIG. 4 may also include one or more housing portions 404A and/or 404B mounted to or mountable to one another and/or to a housing that encompasses one or each of, or a portion of one of or each of the ball portion and socket portion 412, 402, for example. The housing portions 404A and/or 404B may be configured to slidably support and guide cables 408A and 408B, for example, respectively. Each of cables 408A and 408B may be connected to the connection portion 410. Accordingly, application of a tensile force in direction 416A and/or 416B to cables 408A and/or 408B, respectively, may cause the ball portion 412 slidably rotate relative to socket portion 402, thereby providing a pivoting point thereby. Thus, in the example described above with regard to FIG. 2, having an end effector 210, if the end effector 210 were to be connected to the connection portion 410 (FIG. 4) to the telescoping portion 214A-C, applying a tensile force to cables 416A and/or 416B may allow the end effector 210 to be selectively movable in the directions shown by arrows 411 (FIG. 4).

While only two representative cables shown and described with relation to FIG. 4, any suitable number of cables may be spaced around the socket housing and/or ball and socket portion 412, 402 and/or connection portion 410, for example, so as to increase the degrees of motion of the end effector that may be produced using selective tension on such cables. Further, it should be understood that the components may be reversed without departing from the scope of the disclosure. For example, the ball portion 412 and/or connection portion 410 may be connected to the telescoping portion 214A (FIG. 2) and/or the tensile force transmission member 222 (FIG. 2), while the socket portion 402 may correspondingly be connected to the end effector 210 (FIG. 2).

A tensile force may be provided to cables 408A and/or 408B in FIG. 4 via action of a communicating actuator (not shown) within or mounted to either of the aforementioned telescoping portions 214A-C (FIG. 2.), for example, or at a location proximal to the biomimetic actuator itself. Further, as shown for example in FIG. 2, when the cable housings 404A and 404B and cables 408A and 408B are incorporated therewith, such housings 404A, 404B, and cables 408A, 408B may optionally extend to or through the telescoping portions 214A-C as shown in FIG. 2 (e.g., as representatively shown as cables/housings 226A and 226B in FIG. 2). In this example implementation, the actuators (not shown in FIG. 2) for providing a tensile force to each of cables 408A and 408B (FIG. 4) may be located, for example, at the top of the support arm near the gantry or at a location remote from the support arm. While the term actuator is used herein, it is noted that the term is not intended to be limited to a specific type of force-application member or device. Some examples of the aforementioned actuators may include any one or a combination of servos, motors, pneumatic or hydraulic linear or rotational actuators for imparting a tensile force to the cables 408A and 408B within housings 404A and 404B.

Figure 5:
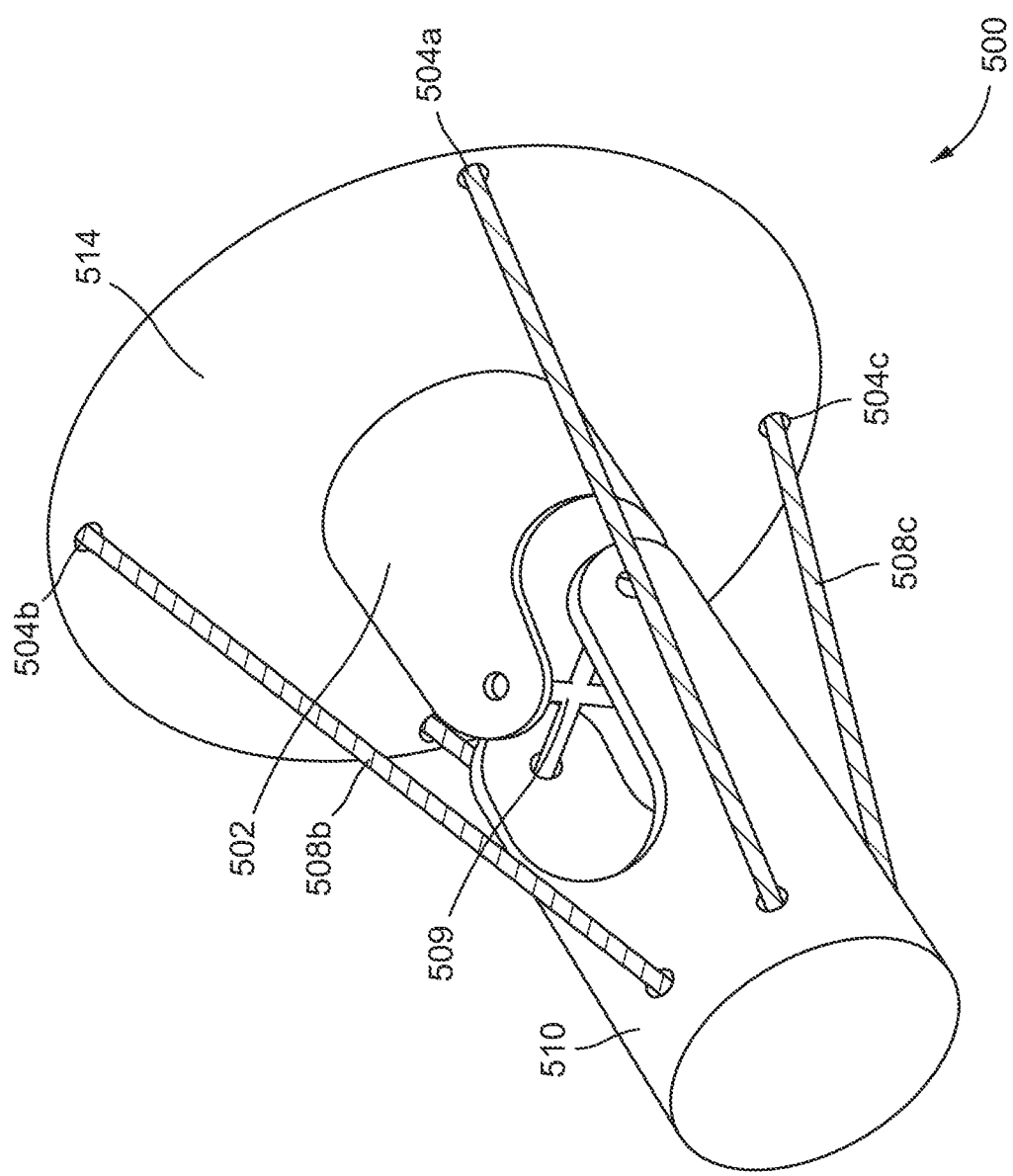
FIG. 5 is a perspective view of a biomimetic actuator usable with the support arm in accordance with an aspect of the disclosure.

Another example biomimetic actuator is shown in FIG. 5. The biomimetic actuator may include a universal joint 509 that is operatively coupled to a first extending member 502. The actuator may further include a second extending member 510 operatively coupled to the universal joint 509. In one example, the second extending member 510 may be mounted to or mountable to an end effector 210 (FIG. 2) of the support arm 200 (FIG. 2). The first extending member 502 may be connected to or connectable to the telescoping portion 214A (FIG. 2) and/or the tensile force transmission member 222 (FIG. 2). The biomimetic actuator shown in FIG. 5 may also include one or more cable openings 504A-C mounted to or residing in a flange 514 attached to the first extending member. The cable openings 504A-C may be configured to receive and/or slidably support one or more corresponding guide cables 508A-C respectively. Each of cables 508A-C may be connected to the second extending member 510, for example. Accordingly, selective application of a tensile force to one or more of cables 508A-C may cause the second extending member 510 to pivot or move with relation to the first extending portion 502.

Thus, in the example implementation described above with respect to FIG. 2, if the end effector 210 (FIG. 2) is connected to the second pivoting member 510, applying a tensile force to one or more of cables 508A, 508B or 508C may cause the end effector 210 (FIG. 2) to pivot with relation to the support arm 200 (FIG. 2). While only three cables are described with relation to FIG. 5, any suitable number of cables may be spaced about the flange 514 and connected to the second pivoting member to increase the selective range and/or degree of motion that may be imparted to the end effector 210 (FIG. 2). A tensile force may be provided to cables 508A, 508B and/or 508C by an actuator (not shown) within or mounted to the outside of any one of the aforementioned telescoping portions 214A-C (FIG. 2) or at the biomimetic actuator itself. Further, as shown in FIG. 2, the cables 508A-C and/or hosing corresponding with cables 508A-C may correspond to cables 226A and 226B (FIG. 2) and may extend through the telescoping portions 214A-C as shown in FIG. 2. In the aforementioned example, the actuators (not shown) for providing a tensile force to each of cables 508A-C may optionally be located, for example, at the top of the support arm 200 near the gantry 100 (FIG. 1) or at a location remote from the support arm 200.

Figure 6:
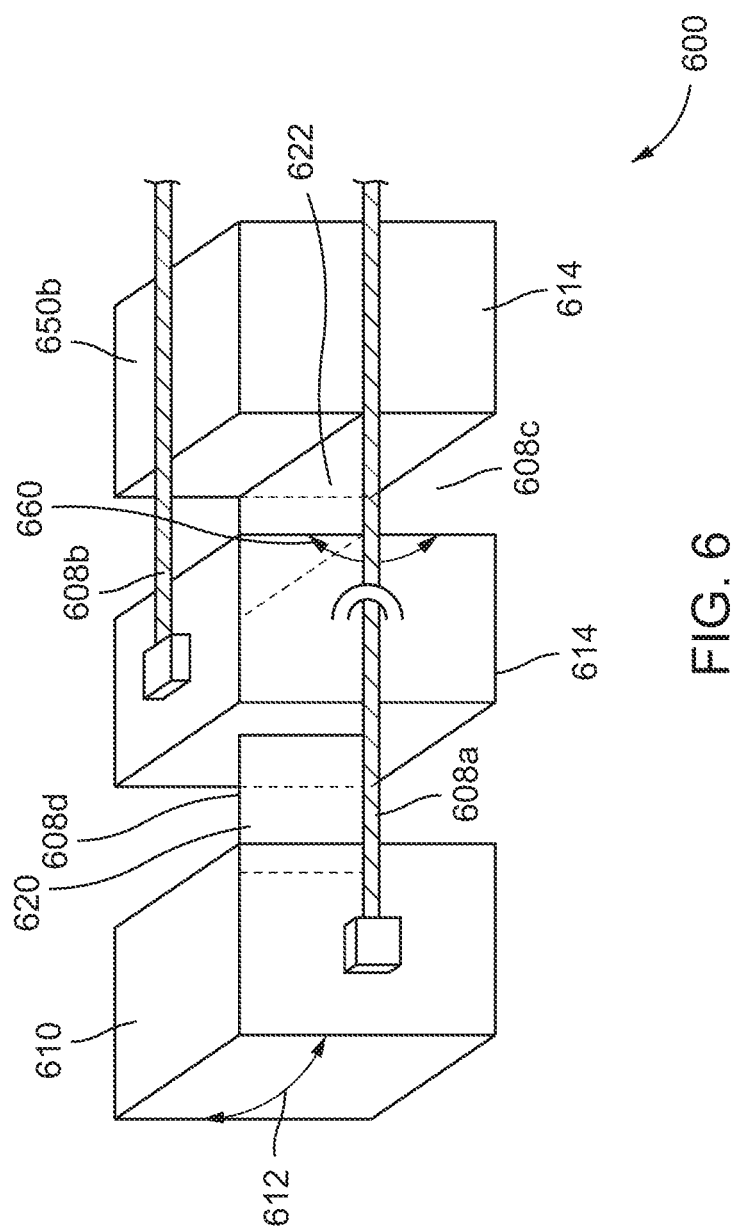
FIG. 6 is a perspective view of a biomimetic actuator usable with the support arm in accordance with an aspect of the disclosure.

Another example biomimetic actuator is shown in FIG. 6. The biomimetic actuator may include a first segment 614, a second segment 611, and a third segment 610. The first segment 614 may be connected to the second segment 611 via a flex plate 622. The first flex plate 622 may be or include a substantially flat flexible member having a substantially planar first surface at least partially forming a first plane. The first flex plate may be flexible along first and second directions represented by arrow 660. The second segment 611 and the third segment 610 may be connected via a second flex plate 620. The second flex plate 620 may be a substantially flat flexible member having a substantially planar first surface that at least partially forms a second plane. As shown in FIG. 6, the second plane may be substantially perpendicular to the first plane, thereby allowing the second segment 611 and third segment 612 to flex in a third and fourth direction represented by arrow 612 while being fairly rigid relative to the first and second directions of potential flexing of the first flex plate 622 represented by arrows 660. While the first flex plate 622 may allow the first segment 614 and the second segment 611 to be flexible with relation to one another in the first and second directions represented by arrows 660, the first flex plate 622 may being fairly rigid relative to flexing in the third and fourth directions represented by arrows 612. The first and second flex plates 620 and 622 may be formed of any flexible or semi-flexible material. For example, the first plate and/or second plate may be formed of steel, an alloy, fiberglass, rubber, an elastomeric or the like.

As further shown in FIG. 6, the first segment 614 may be connected to or connectable to the telescoping portion 214A (FIG. 2) and/or the tensile force transmission member 222 (FIG. 2). The third segment 610 may be connected to an end effector 210 (FIG. 2). The biomimetic actuator shown in FIG. 6 may also include one or more cables 608A and 608B. In one example implementation, the biomimetic actuator shown in FIG. 6 may include a cable 608D opposite cable 608A, which is partially hidden from view in FIG. 6. Further, the biomimetic actuator may include a cable 608C opposite cable 608B. Cables 608B and 608C may for example be connected on opposite sides of the second segment 611 and partially enclosed in a housing corresponding with cable 650B and a housing corresponding with cable 608C (hidden from view in FIG. 6). The housings may be fixed or connected to the first segment 614, for example.

Applying a force to cable 608B or 608C may cause the biomimetic actuator to flex in either one of the first and second directions represented by arrows 660. Further, the third segment 610 may have a cable 608A and a cable 608D opposite cable 608A connected thereto. Providing a tensile force to cable 608A or the cable 608D may cause the biomimetic actuator to flex in either one of the directions represented by arrows 612. Thus, in the example described above that includes an end effector connected to the third segment 610, applying a tensile force to cables 608A, 608B, 608C, or 608D causes the end effector 210 (FIG. 2) to variably pivot with relation to the support arm 200 (FIG. 2). While only three segments, two flex plates, and four cables are shown and described with relation to FIG. 6, any suitable number of segments, flex plates, and cables may be used to increase the degrees of motion possible at the end effector 210 (FIG. 2). Further, it should be understood that the components may be reversed without departing from the scope of the disclosure.

A tensile force may be provided to cables 608A-D via an actuator (not shown) within any of the aforementioned telescoping portions or at the biomimetic actuator itself, for example. Further, as shown in FIG. 2, the cable housings 404A (FIG. 4) and 404B (FIG. 4) and cables 408A (FIG. 4) and 408B (FIG. 4) may extend through the telescoping portions 214A-C as shown in FIG. 2 (e.g., as represented by housings 226A and 226B in FIG. 2). In the aforementioned example, the actuators (not shown in FIG. 2) for providing a tensile force to each of cables 608A-D may be located, for example, at the top of the support arm near the gantry or at a location remote from the support arm. While the term actuator is used herein, it is noted that the term is not intended to be limited to a specific type of force-application member. Some examples of the aforementioned actuators may include any one or a combination of servos, motors, pneumatic or hydraulic linear or rotational actuators for providing a tensile force to the cables 608A-D (FIG. 6) within the aforementioned housings 226A and 226B (FIG. 2).

Figure 7:
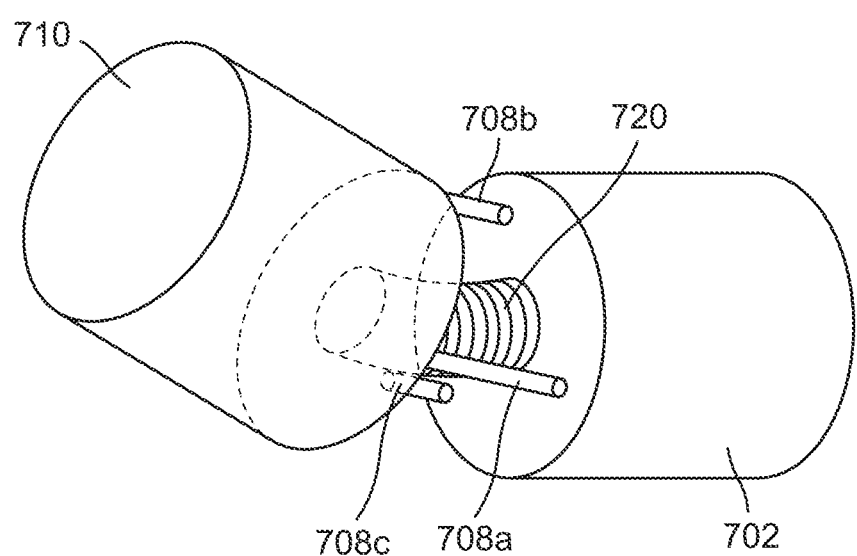
FIG. 7 is a perspective view of a biomimetic actuator usable with the support arm in accordance with an aspect of the disclosure.

Another example biomimetic actuator is shown in FIG. 7. The biomimetic actuator may include a flexible member 720 and a first flexing member 702 mounted to the flexible member 720. The flexible member 720 may be or include any suitable flexible or semi-flexible member capable of being bent in multiple directions. For example, the flexible member may be or comprise a coil spring, an elastomeric tube or solid elastomer, a rubber tube or solid rubber rod, and/or a fiberglass rod, to name a few examples. The biomimetic actuator may further include a second flexing member 710 mounted to the flexible member 720. In one example, the second flexing member 710 may be mounted to or mountable to an end effector 210 (FIG. 2) of the support arm 200. The first flexing member 702 may be connected to or connectable to the telescoping portion 214A (FIG. 2) and/or the tensile force transmission member 222 (FIG. 2), for example. The biomimetic actuator shown in FIG. 7 may also include one or more openings passing through the first flexing member 702. The one or more openings may be configured to slidably support and guide cables 708A-C respectively, for example. Each of cables 708A-C may be connected to the second flexing member 710, for example. Accordingly, application of a tensile force to cables 708A-C may cause the second flexing member 710 to pivot with relation to the first flexing member 702. Thus, in the example described above with an end effector connected to the second flexing member 710, applying a tensile force to cables 708A, 708B, or 708C may cause the end effector 210 (FIG. 2) to selectively pivot with relation to the support arm 200 (FIG. 2). While only three cables are described with relation to FIG. 7, any suitable number of cables may be spaced about first flexing portion 702 and connected to the second flexing portion 710 to increase the amount and/or degrees of motion impartable at the end effector 210 (FIG. 2).

A tensile force may be provided to cables 708A, 708B and/or 708C by an actuator (not shown in FIG. 7) located within any of the aforementioned telescoping portions or at the biomimetic actuator itself, for example. Further, as shown in FIG. 2, the cables 708A-C (FIG. 7) may be encased in housings 226A and 226B and run through the telescoping portions 214A-C. In the aforementioned example, the actuators for providing a tensile force to each of cables 708A-C may be located at the top of the support arm near the gantry or at a location remote from the support arm, for example.

Figure 8B:
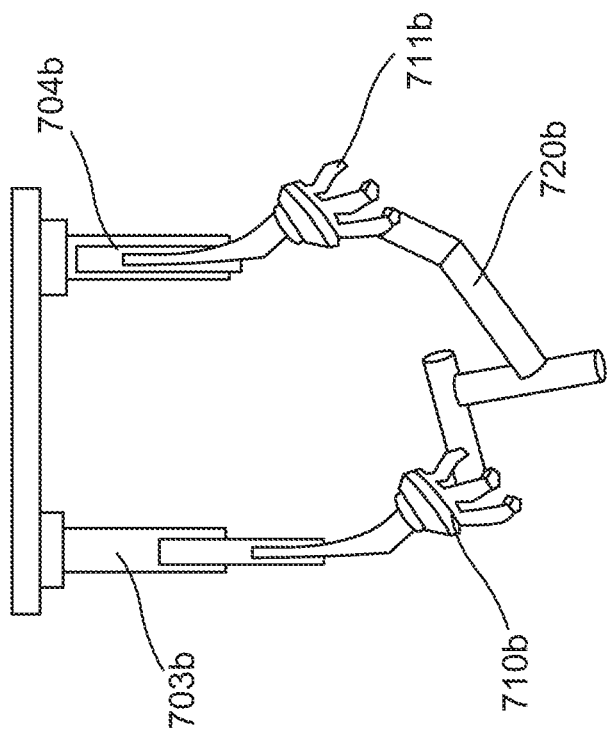
Figure 8A:
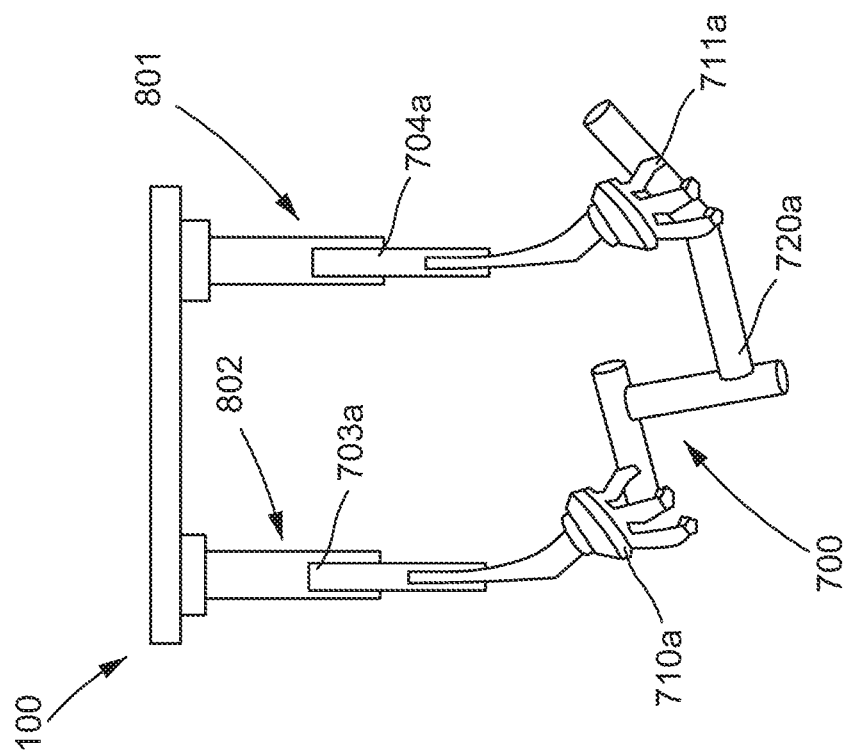

As shown in FIGS. 8A-D, a robot system utilized in a work environment may comprise a plurality of the aforementioned support arms mounted to a single or multiple gantry systems. For example, as shown in FIG. 8A, a first support arm 801 and second support arm 802 may be used to hold a single load or object 700. Further, through movement of the first support arm 802 and the second support arm 801 from positions 704A (FIG. 8A) to 704D (FIG. 8D) and 703A (FIG. 8A) to 703D (FIG. 8D) respectively, the load and or object 700 may be manipulated though a series of orientations 720A-720D (FIGS. 8A-8D). This manipulation may be useful, for example, if the load or object is a portion of an assembly. For example, in a manufacturing process, a worker or plurality of workers may add a number of components to an assembly. Using object 700 as an example of such an assembly process, position 720A (FIG. 8A) of object 700 may be most convenient for the addition or assembly of a first component onto object 700. Position 720B (FIG. 8B) may be an orientation most convenient for the addition or assembly of a second component onto object 700 and so on.

Figure 9B:
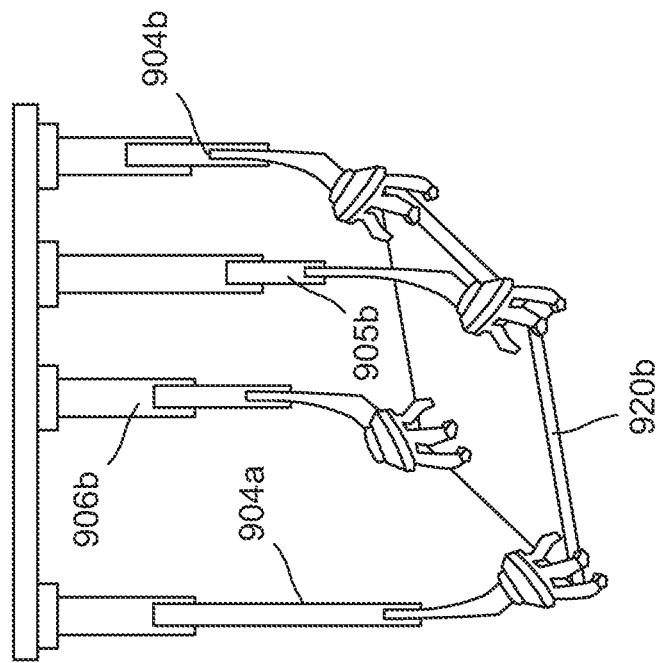
FIGS. 9A-B are simplified plan views of a support robot system implementing multiple support arms as described with respect to FIGS. 1-7.
Figure 9A:
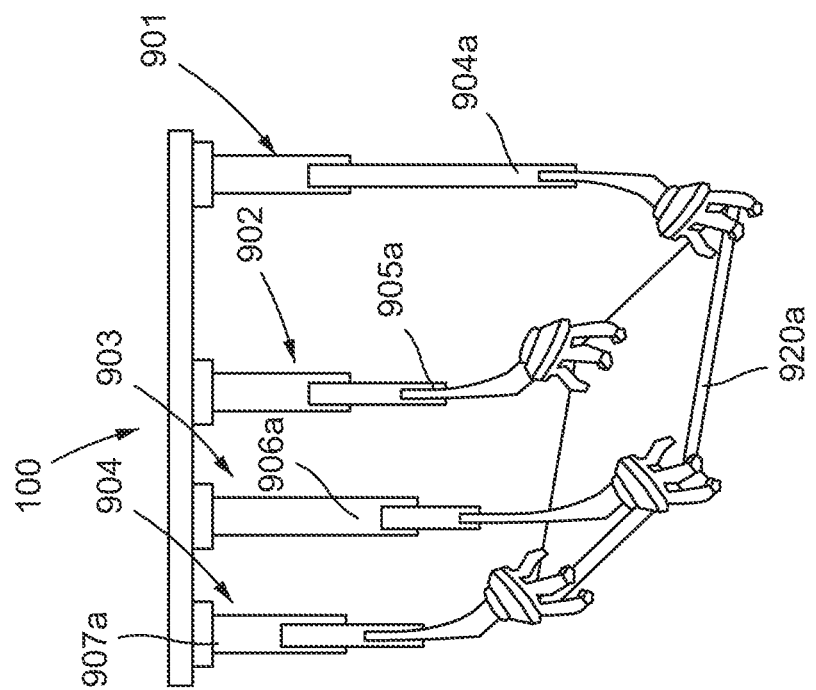

Another example using four support arms 901-904 is shown in FIGS. 9A-9B. Again an object may be manipulated from at least a first position 920A (FIG. 9A) to a second position 920B (FIG. 9B) thorough various positions of the support arms 901-904.

Figure 10:
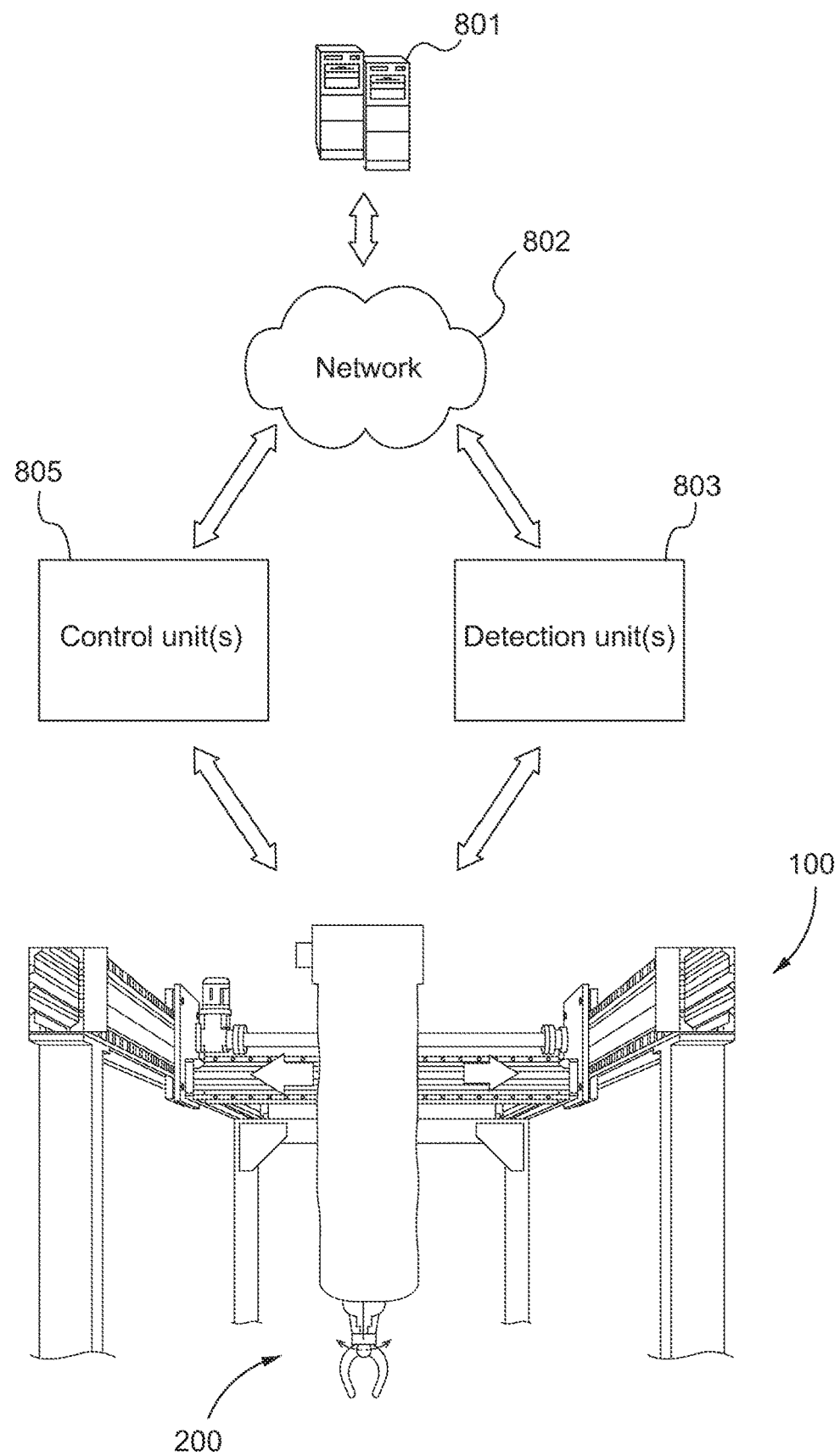
FIG. 10 is an example control system in accordance with an aspect of the disclosure.

As shown in FIG. 10, the support arm 200 and/or gantry 100, as illustrated in any of the aforementioned figures, may further include and/or be in signal communication with at least one detection unit 803. A detection unit or units 803 may, for example, include a single or series of sensors or other monitoring devices or systems for determining the distance from and/or a position of a user (not shown) with relation to the gantry 100 and/or the support arm 200. The detection unit 803 may further detect a user motion or other signal. Further, the detection unit may determine a location of the user with relation to a workpiece (not shown) supported by the support arm 200. Any one of or a combination of the aforementioned determinations may be used to adjust the operation of the gantry 100 and/or the support arm 200. The detection unit may include any one of or a combination of sensors or detectors. For example, a complementary metal-oxide-semiconductor ("CMOS") or charge-coupled device ("CCD") cameras may be employed as sensors to detect the environment, such as by recognizing various items.

Further, the detection unit 803 may include at least one laser scanner, which may be used as an alternative to or in combination with the aforementioned cameras. The laser scanner may be or include, for example, a Light Detection and Ranging ("LIDAR") device. In an aspect, a one dimensional LIDAR device may be used. A one-dimensional LIDAR device may measure a detected distance and received signal strength of reflected light from its emissions. Although more complicated two-dimensional and three-dimensional LIDAR devices may be available and may be used in accordance with aspects of the present disclosure, a one-dimensional LIDAR device may also be used. In one example implementation of a LIDAR device, a laser scanner may scan areas around the gantry 100 and/or the support arm 200 by projecting a light beam at multiple angles. The laser scanner may be rotatably mounted to gantry 100 and/or the support arm 200. In one example, the LIDAR device may also include a laser scanner controller for electronically controlling the laser scanner and the servo motor. The laser scanner controller may reciprocally rotate the laser scanner along an arc centered in the direction of motion of the gantry 100 and/or the support arm 200, for example. That is, the laser scanner may sweep an arc in a first direction, then the servo motor may reverse direction and sweep an arc in the opposite direction. The positioning of the gantry 100 and/or the support arm may be controlled via a control unit or plurality of control units 805. As shown in FIG. 10, the control unit(s) and/or the detection unit(s) 803 may be in signal communication with server 801 via a network 802.

Figure 11:
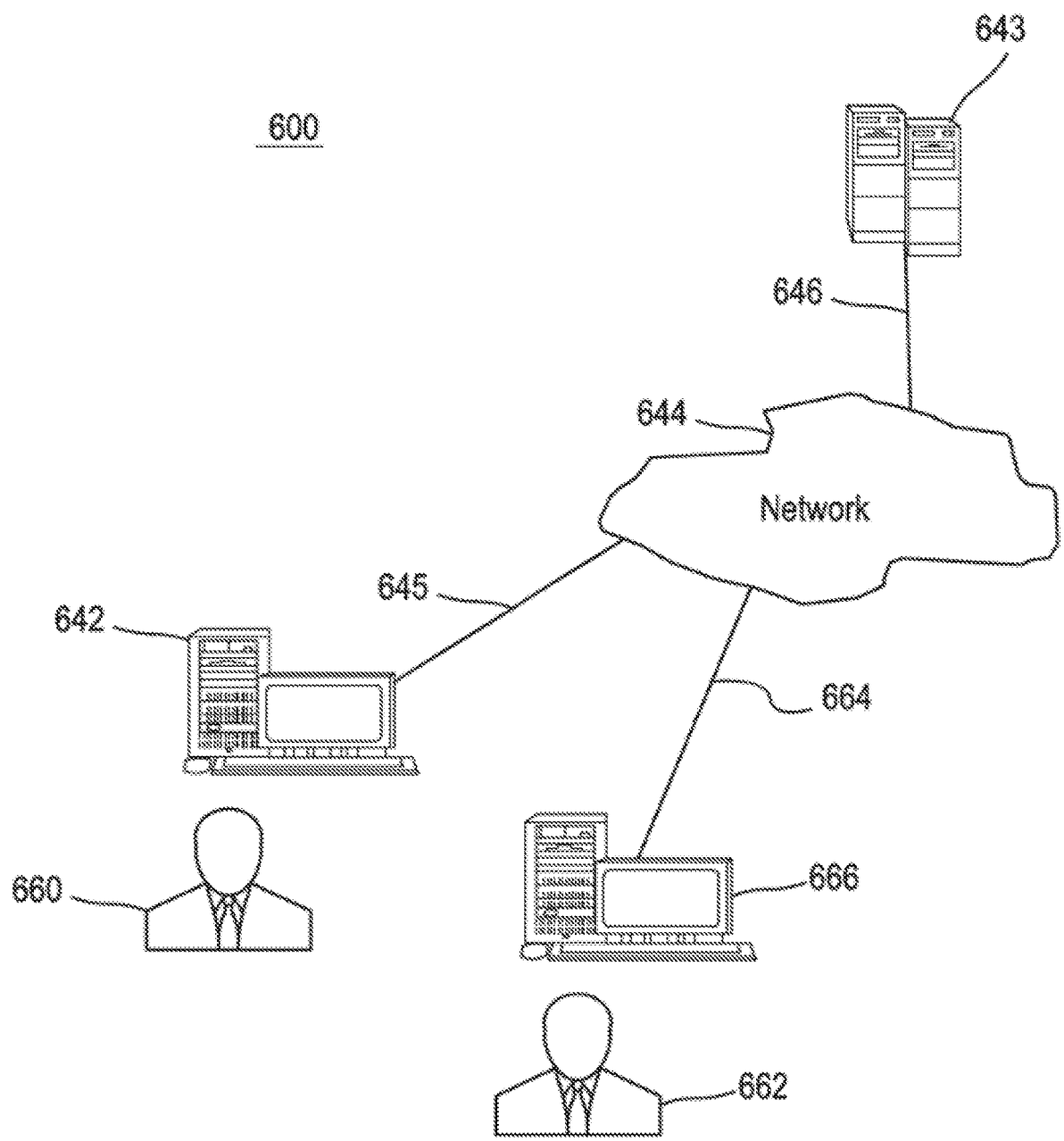
FIG. 11 is a block diagram of various example system components according to one aspect of the disclosure.

FIG. 11 is a block diagram of various example system components, in accordance with an example implementation of various features on a network. FIG. 11 shows various features of a communication system 600 usable in accordance with aspects described herein. The communication system 600 includes one or more accessors 660, 662 (also referred to interchangeably herein as one or more "users") and one or more terminals 642, 666. For example, terminals 642, 666 can include one or more of the control unit(s) 805 and/or detection unit(s) 803 and/or any aspects for controlling the system(s) shown in FIGS. 1-10 or by other users at other locations remote from the aforementioned aspects. In one aspect, data for use in accordance with aspects described herein is, for example, input and/or accessed by accessors 660, 662 via terminals 642, 666, such as robots, personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

Figure 12:
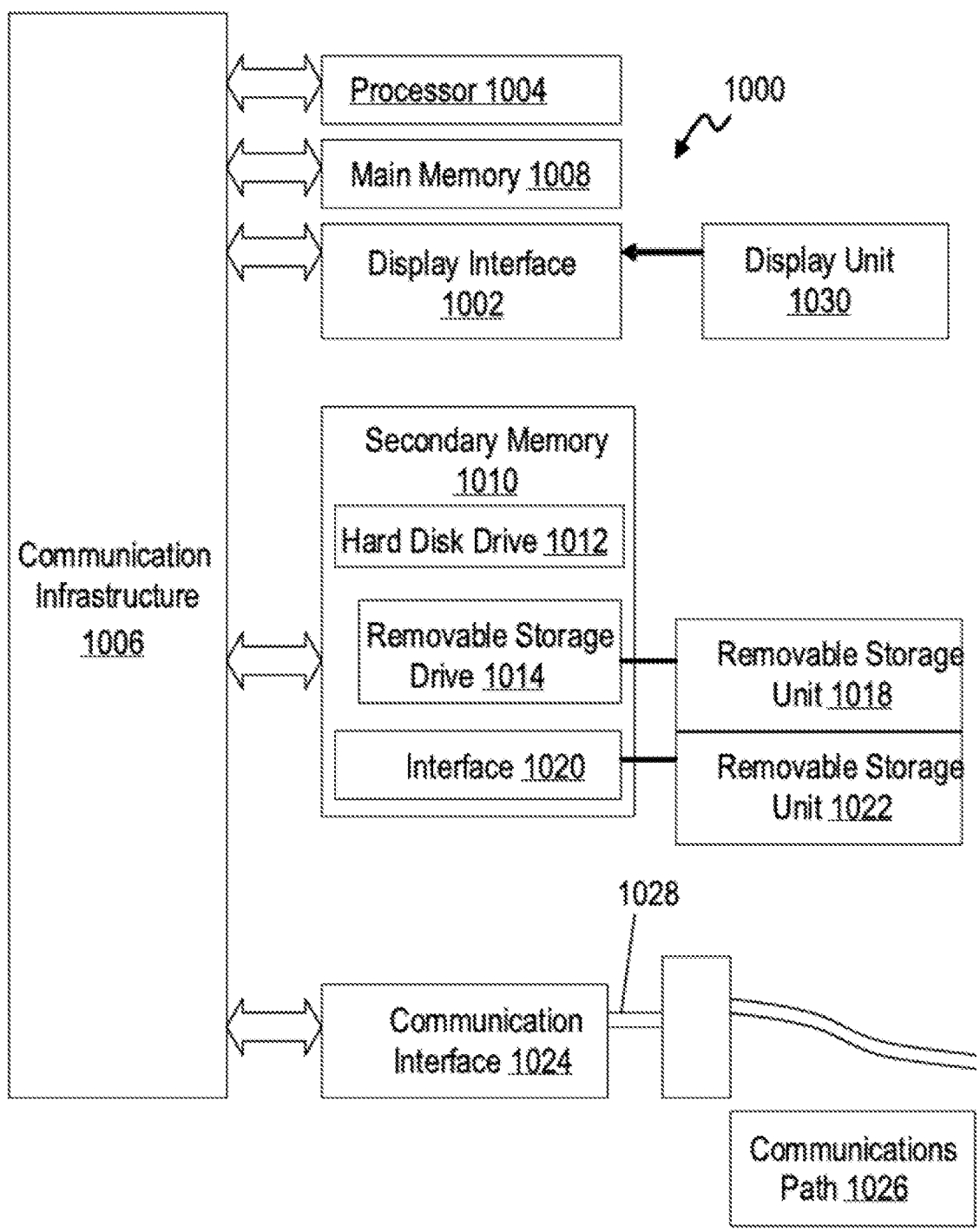
FIG. 12 illustrates an example computer system for an electronic system in accordance with an aspect of the disclosure.

Various aspects of the abovementioned control of the support arm and/or gantry and various system features shown and described in relation to FIGS. 1-11 may be implemented using hardware, software, or a combination thereof and may be implemented in one or more computer systems or other processing systems. In an aspect of the present disclosure, features are directed toward one or more computer systems capable of carrying out the functionality of the data processing disclosed above. An example of such a computer system 1000 is shown in FIG. 12.

Computer system 1000 includes one or more processors, such as processor 1004. The processor 1004 is connected to a communication infrastructure 1006 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 1000 may include a display interface 1002 that forwards graphics, text, and other data from the communication infrastructure 1006 (or from a frame buffer not shown) for display on a display unit 1030. Computer system 1000 also includes a main memory 1008, preferably random access memory (RAM), and may also include a secondary memory 1010. The secondary memory 1010 may include, for example, a hard disk drive 1012, and/or a removable storage drive 1014, representing a floppy disk drive, a magnetic tape drive, an optical disk drive, a universal serial bus (USB) flash drive, etc. The removable storage drive 1014 reads from and/or writes to a removable storage unit 1018 in a well-known manner. Removable storage unit 1018 represents a floppy disk, magnetic tape, optical disk, USB flash drive etc., that is read by and written to removable storage drive 1014. As will be appreciated, the removable storage unit 1018 includes a computer usable storage medium having stored therein computer software and/or data.

Alternative aspects of the present invention may include secondary memory 1010 and may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, that allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (e.g., channel) 1026. This path 1026 carries signals 1028 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1018, a hard disk installed in hard disk drive 1012, and signals 1028. These computer program products provide software to the computer system 1000. Aspects of the present invention are directed to such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features in accordance with aspects of the present invention, as discussed herein. In particular, the computer programs, when executed, enable the processor 1004 to perform the features in accordance with aspects of the present invention. Accordingly, such computer programs represent controllers of the computer system 1000.

In an aspect of the present invention where the invention is implemented using software, the software may be stored in a computer program product and loaded into computer system 1000 using removable storage drive 1014, hard drive 1012, or communications interface 1020. The control logic (software), when executed by the processor 1004, causes the processor 1004 to perform the functions described herein. In another aspect of the present invention, the system is implemented primarily in hardware using, for example, hardware components, such as application specific integrated circuits (ASICs).

Figure 13:
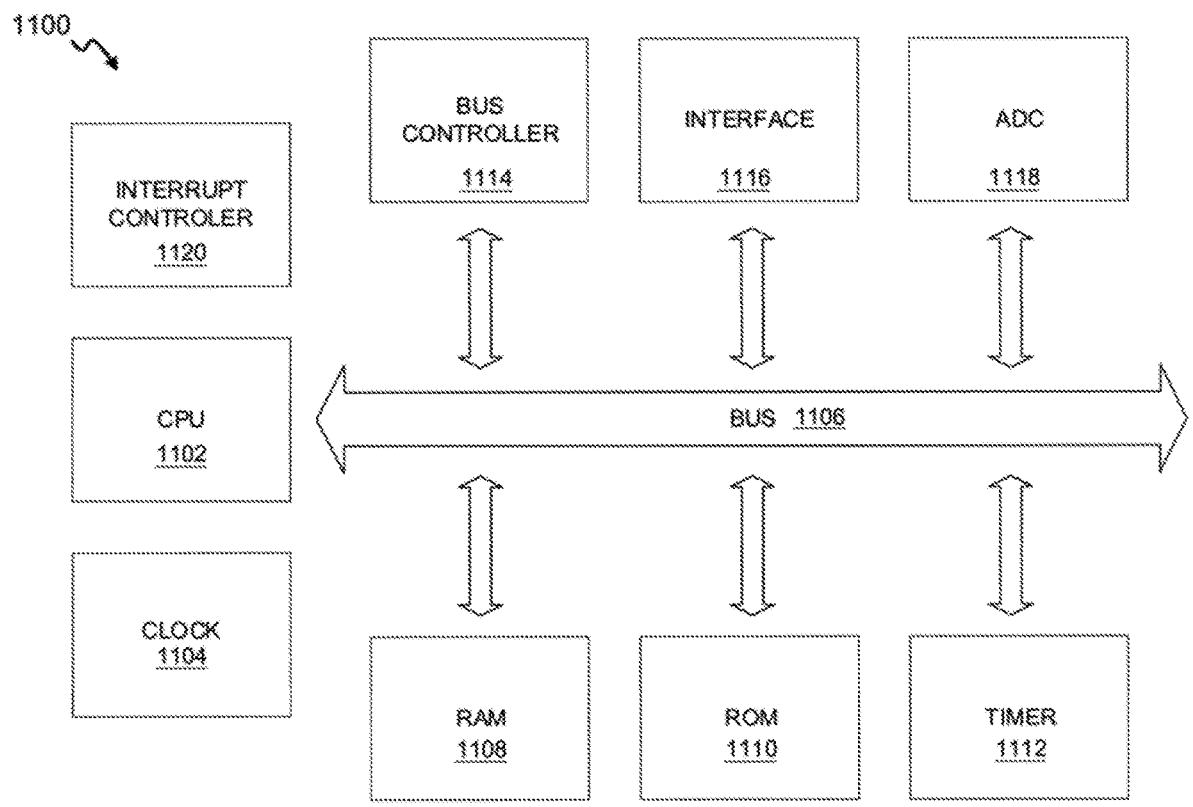
FIG. 13 is an example microcontroller in accordance with an aspect of the disclosure.

In some implementations, one or more microcontrollers may be implemented for carrying out certain features of the present disclosure, such as control features contained within the support arm(s) and or gantry(s) shown in of FIGS. 1-10. In one aspect, for example, the control unit or unit(s) 805 (FIG. 10) may comprise a single or multiple microcontrollers. An example of such a microcontroller 1100 is shown in FIG. 13. The microcontroller 1100 includes a CPU 1102, RAM 1108, ROM 1110, a timer 1112, a BUS controller, an interface 1114, and an analog-to-digital converter (ADC) 1118 interconnected via an on board BUS 1106.

The CPU 1102 may be implemented as one or more single core or multi-core processors, and receive signals from an interrupt controller 1120 and a clock 1104. The clock 1104 sets the operating frequency of the entire microcontroller 1100 and may include one or more crystal oscillators having predetermined frequencies. Alternatively, the clock 1104 may receive an external clock signal. The interrupt controller 1120 may also send interrupt signals to the CPU to suspend CPU operations. The interrupt controller 1120 may transmit an interrupt signal to the CPU when an event requires immediate CPU attention.

The RAM 1108 may include one or more SRAM, DRAM, SDRAM, DDR SDRAM, DRRAM or other suitable volatile memory. The ROM 1110 may include one or more PROM, EPROM, EEPROM, flash memory, or other types of non-volatile memory.

The timer 1112 may keep time and/or calculate the amount of time between events occurring within the microcontroller 1100, count the number of events, and/or generate baud rate for communication transfer. The BUS controller 1114 prioritizes BUS usage within the microcontroller 1100. The ADC 1118 allows the microcontroller 1100 to send out pulses to signal other devices. The interface 1116 is an input/output device that allows the microcontroller 1100 to exchange information with other devices. In some implementations, the interface 1116 may include one or more parallel port, a serial port, or other computer interfaces.

Various aspects of the control systems associated with movement of the support arms and/or gantry systems and usable with the current disclosure are further discussed in U.S. application Ser. No. 16/210,689, entitled "SUPPORT ROBOT AND METHODS OF USE THEREOF," filed on Dec. 5, 2018; the entirety of which is incorporated by reference herein.

This written description uses examples to disclose aspects of the disclosure, including the preferred aspects, and also to enable any person skilled in the art to practice the invention, including making and using any devices or systems and performing any incorporated methods. The patentable scope hereof is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various aspects described, as well as other known equivalents for each such aspect, can be mixed and matched by one of ordinary skill in the art to construct additional aspects and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

What is claimed is:

1. A support arm usable with a gantry robot system, the support arm comprising:
   an interface connectable to an end effector;
   a telescoping section operatively connected to the interface;
   a tensile force transmitting member connected to an actuator, wherein the actuator is configured to move the interface towards and away from the actuator via the tensile force transmitting member;
   an inflatable outer cover at least partially encasing the telescoping section and the tensile force transmitting member; and
   a fluid pump configured to inflate the inflatable outer cover.

2. The support arm of claim 1, wherein the fluid pump is capable of increasing or decreasing fluid pressure inside the inflatable outer cover, wherein an increase in pressure causes the inflatable outer cover to extend away from the actuator.

3. The support arm of claim 2, wherein at least a portion of the inflatable outer cover is configured to be stored in a compacted state, wherein the increase in fluid pressure causes a portion of the inflatable outer cover that is stored in a compacted state to extend towards the interface.

4. The support arm of claim 2, further comprising a storing spool, wherein at least a portion of the inflatable cover is capable of being windably retracted onto a storing spool.

5. The support arm of claim 1, wherein the actuator comprises a winch having a rotatable surface, wherein the tensile force transmitting member is a cable capable of being wound around the rotatable surface of the winch.

6. The support arm of claim 1, wherein the actuator comprises a nut assembly, wherein the tensile force transmitting member comprises a screw shaft, and wherein the nut assembly is capable of engageably receiving the screw shaft.

7. The support robot of claim 1, wherein the interface is connected to a biomimetic actuator and the biomimetic actuator is capable of moving the end effector, wherein the support robot further comprises:
   at least one cable for causing the biomimetic actuator to bend.

8. A support robot system, comprising:
   a gantry for providing at least two degrees of motion; and
   a support arm connected to the gantry, wherein the support arm provides at least an additional degree of motion with relation to the two degree of motion provided by the gantry, the support arm comprising:
   an interface connectable to an end effector;
   a telescoping section operatively connected to the interface;
   a tensile force transmitting member operably connected to an actuator, wherein the actuator is capable of moving the interface towards and away from the actuator via the tensile force transmitting member;
   an inflatable outer cover at least partially encasing the telescoping section and the tensile force transmitting member; and
   a fluid pump configured to inflate the inflatable outer cover.

9. The support robot system of claim 8, wherein the telescoping section at least partially encases the tensile for transmitting member.

10. The support robot system of claim 8,
    wherein the fluid pump is configured to increasing or decreasing fluid pressure inside the inflatable outer cover; and
    wherein an increase in pressure causes the inflatable outer cover to extend away from the actuator.

11. The support robot system of claim 10, wherein at least a portion of the inflatable outer cover is configured to be arranged in a compacted orientation, wherein the increase in fluid pressure causes a portion of the inflatable outer cover that is stored in a compacted state to extend towards the interface.

12. The support robot system of claim 11, further comprising a storing spool, wherein at least a portion of the inflatable cover is capable of being windably retracted onto a storing spool.

13. The support robot system of claim 11, wherein the actuator is a winch having a rotatable surface, wherein the tensile force transmitting member is configured to be wound around a rotatable surface of the winch.

14. The support robot system of claim 11, wherein the actuator comprises a nut assembly and the tensile force transmitting member comprises a screw shaft, wherein the nut assembly is configured to engageably receive a helically toothed portion of the screw shaft.

15. The support robot system of claim 11, wherein the interface further comprises a biomimetic actuator.

16. The support robot system of claim 15, further comprising at least one cable for causing the biomimetic actuator to bend.

17. A support robot system comprising:
at least one first support arm, wherein the at least one first support arm provides at least one degree of motion;
a support arm supporting mechanism connected to the at least one first support arm and capable of providing at least two degrees of motion with relation to the at least one degree of motion of the at least one first support arm, wherein the at least one first support arm further comprises:
an biomimetic actuator connectable to an end effector;
a telescoping section operatively connected to the biomimetic actuator;
a tensile force transmitting member connected to an actuator, wherein the actuator is capable of moving the biomimetic actuator towards and away from the actuator via the tensile force transmitting member;
an inflatable outer cover at least partially encasing the telescoping section and the tensile force transmitting member; and
a fluid pump configured to inflate the inflatable outer cover.

18. The support robot system of claim 17, wherein the telescoping section at least partially encases the tensile force transmitting member.

19. The support robot system of claim 17, further comprising at least two cables for causing the biomimetic actuator to bend in a first direction and a second direction different from the first direction.

20. The support robot system of claim 17, wherein the fluid pump is capable of increasing or decreasing fluid pressure inside the inflatable outer cover, wherein an increase in pressure causes the inflatable outer cover to extend away from the actuator.

21. The support robot system of claim 17, further comprising a second support arm providing at least one degree of motion, wherein the second support arm further comprises a second support arm end effector, wherein the second support arm end effector is capable of grasping or supporting an article held by the first support arm.

* * * * *